United States Patent [19]

Jacobe et al.

[11] 4,260,648
[45] Apr. 7, 1981

[54] METHOD FOR FORMING MAGNETIC RECORDING REGIONS ON PHOTOGRAPHIC ELEMENTS

[75] Inventors: Walter W. Jacobe, Rochester; Gary K. Bien, Webster, both of N.Y.

[73] Assignee: Eastman Kodak Company, Rochester, N.Y.

[21] Appl. No.: 37,585

[22] Filed: May 9, 1979

[51] Int. Cl.³ .............................................. B05D 3/02
[52] U.S. Cl. .................................. 427/45.1; 427/128; 427/130; 427/131; 430/510
[58] Field of Search .......................... 427/45, 128–132, 427/47, 48, 45.1; 430/510

[56] References Cited

U.S. PATENT DOCUMENTS 3,705,819  12/1972  Heller et al. .......................... 427/45
3,782,947  1/1974  Krall ........................................ 96/67

Primary Examiner—Bernard D. Pianalto
Attorney, Agent, or Firm—A. P. Lorenzo

[57] ABSTRACT

Photographic elements are provided with a magnetic recording region, such as a stripe or layer, that is useful for sound recording, by applying a dispersion of finely-divided magnetic particles in a liquid medium to the element in a predetermined form and solidifying the dispersion by bringing the element into contact with an induction-heating apparatus. The apparatus comprises a rotatable cylindrical roller whose cylindrical surface engages the element and which is heated by induction only within a rim portion thereof so as to generate heat adjacent to the cylindrical surface for efficient transfer to the element.

13 Claims, 5 Drawing Figures

METHOD FOR FORMING MAGNETIC RECORDING REGIONS ON PHOTOGRAPHIC ELEMENTS

CROSS-REFERENCES TO RELATED APPLICATIONS

United States patent application Ser. No. 40,605, entitled "Photographic Element Provided With A Magnetic Recording Stripe And Method For Manufacture Thereof" filed on May 18, 1979, in the names of Edward D. Morrison, Harry J. Krall, David L. Carr and Chen-i-Lu discloses a magnetic striping composition containing finely-divided magnetic particles and an acrylated epoxy resin and its use in forming a magnetic recording stripe on a photographic element.

BACKGROUND OF THE INVENTION

Field of the Invention

This invention relates in general to photography and in particular to photographic elements provided with a magnetic recording region, such as a stripe or layer, that is useful for sound recording. More specifically, this invention relates to a method for forming a magnetic recording region on a photographic element in which a dispersion of finely-divided magnetic particles in a liquid medium is applied to the element in a predetermined form and the dispersion is solidified by bringing the element into contact with an induction-heating apparatus.

2. Description of the Prior Art

It is well known to form magnetic recording stripes on photographic elements, such as motion picture films, and a variety of procedures have been developed to accomplish this objective. The magnetic recording stripe can be applied to the image-forming side of a photographic element, for example, it can be applied within a narrow groove formed within a silver halide emulsion layer. Alternatively, the magnetic recording stripe can be applied directly to the support on the side opposite to the image-forming layer(s). When the photographic element is of the type which has an anti-halation layer on the side of the support opposite to the image-forming layer(s), the usual practice is to apply the magnetic recording stripe to that side of the support that carries the anti-halation layer. This can be done by removing the anti-halation layer locally before applying the stripe, as described in U.S. Pat. No. 3,050,758. Alternatively, it can be done by forming a magnetic striping composition which is capable of penetrating through the anti-halation layer to the support, as described in U.S. Pat. No. 3,220,843, or by applying a magnetic striping composition which reacts chemically with the binder of the anti-halation layer as described in U.S. Pat. No. 3,840,374.

It is a common procedure, in forming a magnetic recording stripe on a photographic element in accordance with the processes of the prior art, to dry the stripe in a drying chamber in which it is contacted with a hot gaseous medium, such as air that has been heated to an elevated temperature. This procedure suffers from many disadvantages; for example, it usually requires a very lengthy drying period with the result that the drying chambers must be of great length and, consequently, are very costly. Moreover, because of the long time and relatively high temperatures needed for drying, re-humidification chambers may be needed to replace moisture driven out of the photographic element during the drying operation. This adds greatly to the cost and complexity of the equipment. Also, in cases where a solvent incorporated in the striping composition is of high boiling point, the temperatures required to completely dry the stripe may be so high as to render it very difficult to avoid damage to the photographic element.

In addition to the application of magnetic recording stripes, it is also known to provide photographic elements with magnetic layers which can, if desired, be co-extensive in width with the image-forming layer(s) of the element. Photographic elements comprising such magnetic layers are disclosed in U.S. Pat. No. 3,782,947. As described in this patent, in this type of element the granularity of the magnetic recording medium is matched to the granularity of the photographic medium so that the magnetic recording medium is essentially transparent in a photographic sense. Thus, the photographic image can be viewed through the magnetic recording medium and the magnetic recording medium can be employed for recording and playback of information. Solidification of the magnetic recording medium in this type of element has also been carried out heretofore in drying chambers in which the element is contacted with a hot gaseous medium and suffers equally from the disadvantages described hereinabove with reference to the solidification of magnetic recording stripes.

It is toward the objective of providing an improved method for magnetic striping of photographic elements, or for the formation of magnetic recording layers or other magnetic recording regions, which eliminates the need for drying chambers utilizing a hot gaseous medium or enables such chambers to be of shorter length or to utilize lower temperatures, that the present invention is directed.

SUMMARY OF THE INVENTION

In accordance with this invention, a magnetic recording region is formed on a photographic element by applying to the element in a predetermined form a dispersion of finely divided magnetic particles in a liquid medium and bringing the element into contact with a surface of an induction-heating apparatus to solidify the dispersion by transferring heat thereto. The induction-heating apparatus utilized in this process comprises a cylindrical roller which is mounted for rotation about its axis and whose cylindrical surface engages the photographic element as it moves across the apparatus. The cylindrical roller is constructed in such a manner that heat is generated by induction only within a rim portion thereof, for example, it is a hollow cylinder or a cylinder having a core of electrically-insulating material and a rim of electrically-conductive material. By induction heating of only the rim portion of the cylindrical roller, heat is generated adjacent to the cylindrical surface for efficient transfer to the photographic element. The method of this invention is useful with photographic elements in which a magnetic recording stripe or other form of magnetic recording region has been applied to the image-forming side of the element or to the support side. It is capable of providing good results with dispersions that are applied directly to the support and with dispersions that are applied over an anti-halation layer. It is useful with any type of magnetic recording composition that can be solidified by input of heat, whether it be a composition that is dried by evaporation of the liquid medium, that is cured by chemical reaction between the components of the liquid medium, or that is solidified by evaporation of some components of the liquid medium and chemical reaction of others. In utilizing induction heating, the magnetic recording region can be brought into direct contact with the induction-heated rim or it can be spaced from the rim when it is advantageous to avoid contact. Heat can be transferred from the rim to the magnetic recording region by conduction, convection or radiation or by various combinations thereof.

DESCRIPTION OF THE PREFERRED EMBODIMENTS

Figures 1, 2:
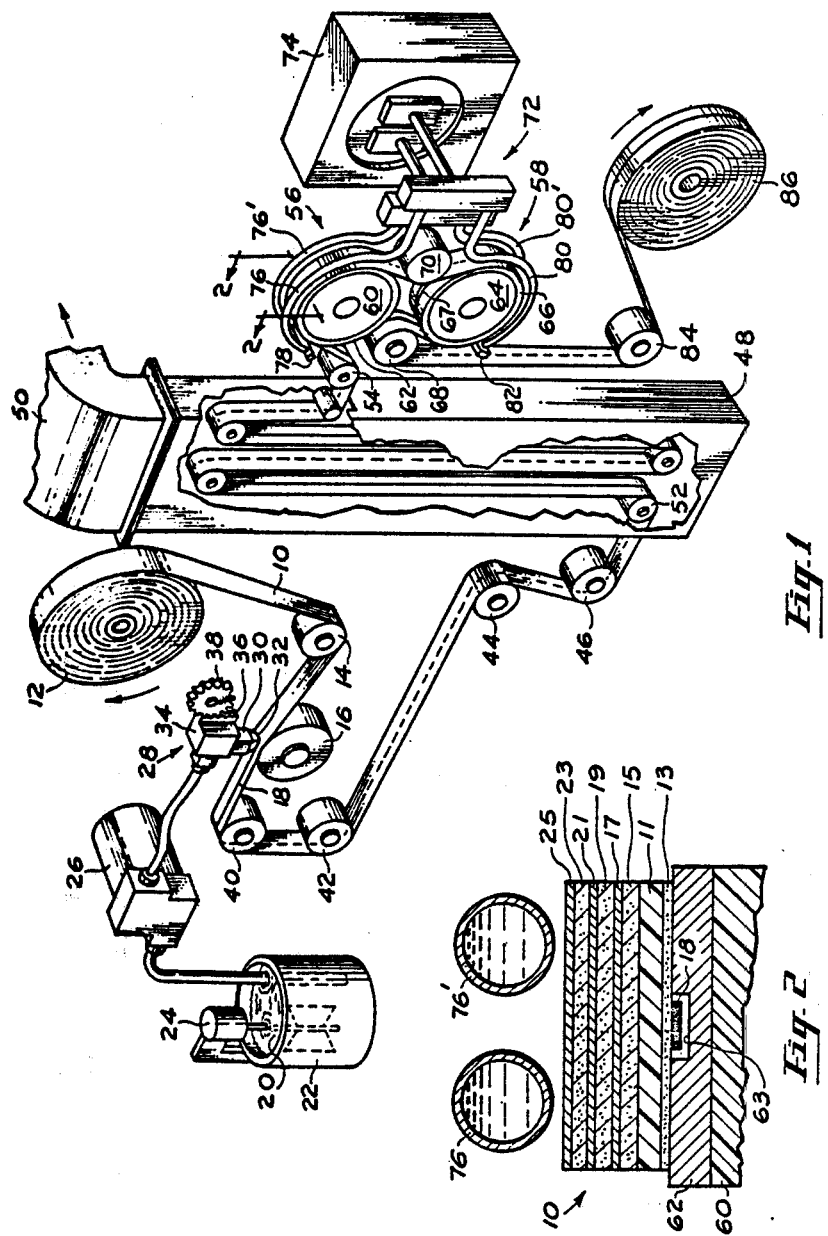
FIG. 1 is a perspective view of apparatus, including a preferred form of induction-heating device, suitable for carrying out the method of this invention.
FIG. 2 is a partial cross-section taken substantially along the line 2—2 in FIG. 1.

In the practice of this invention, the magnetic dispersion can be applied to the photographic element in any predetermined form as desired, for example, in the form of a narrow stripe, a plurality of narrow stripes, a layer, or a continuous or discontinuous pattern. For convenience, the invention is described in detail hereinafter which reference to the formation of a narrow magnetic recording stripe such as is commonly employed with motion picture films.

Photographic elements which can be provided with a magnetic recording stripe by the method of this invention can differ greatly in structure and composition. For example, they can vary greatly in regard to the type of support, the number and composition of the image-forming layers, and the kinds of auxiliary layers that are present. The magnetic recording stripe can be located on the image-forming side of the photographic element or on the support side. When the photographic element has an anti-halation layer coated on one side of the support, the magnetic recording stripe will usually be applied over the anti-halation layer. In most cases, the photographic element will be provided with a balance stripe as well as a recording stripe. The balance stripe is located on the same side of the photographic film as the recording stripe but adjacent to the opposite edge of the film and is intended to provide for uniform stacking of the film convolutions as the film is wound on a core. Both the recording stripe and the balance stripe are very narrow—typically about 0.7 millimeters for the recording stripe and about 0.35 millimeters for the balance stripe on 8 millimeter motion picture film.

Magnetic striping compositions are typically applied to photographic elements after the image-forming layer(s) and auxiliary layers have been applied. Thus, for example, a web support can be coated on one side with an anti-halation layer, then coated on the opposite side with one or more image-forming layers, such as silver halide gelatin emulsion layers, then slit to a desired narrow width, and then striped with a magnetic striping composition. This procedure is advantageous in that the wide web is adapted to efficient and economical coating of anti-halation and image-forming layers and the narrow strips cut from the web are adapted to efficient and economical handling in a striping operation. However, the image-forming layer(s) can be applied after magnetic striping, if desired, so that the element to which the magnetic striping composition is applied can be comprised of a support, an anti-halation layer and one or more image-forming layers or only of a support and an anti-halation layer. In applying the magnetic striping composition after application of the image-forming layer(s) it is, of course, essential that the conditions utilized in applying and curing the stripe do not harm the sensitive image-forming layers and this renders this process of magnetic striping especially difficult. In addition to the aforesaid pre-striping procedures, that is, procedures in which the magnetic stripe is applied prior to image-wise exposure and processing of the element, the method of this invention can also be usefully employed in post-striping procedures, that is, procedures in which the magnetic stripe is applied after image-wise exposure and processing.

Photographic elements which can be provided with a magnetic recording stripe by the method of this invention can be comprised of any of the useful photographic support materials. For example, the support can be composed of cellulose esters such as cellulose triacetate, cellulose acetate propionate or cellulose acetate butyrate, polyesters such as poly(ethylene terephthalate), polyamides, polycarbonates, polyimides, polyolefins, poly(vinyl acetals), polyethers, polysulfonamides, and the like.

Anti-halation layers are comprised of a dye or pigment, which functions to absorb light, dispersed in an alkali-soluble binder that renders the layer removable by an alkaline photographic processing solution. Their function is to prevent light that strikes the support from being reflected into the image-forming layer(s). Most commonly, the light-absorbing material utilized is carbon black and the binder is a cellulose ester such as cellulose acetate phthalate. Anti-halation layers containing carbon black and cellulose acetate phthalate are described in the prior art, for example in U.S. Pat. No. 2,327,828. Dyes or other pigments can, of course, be used in place of carbon black and a wide variety of alkali-soluble binders can be used in place of cellulose acetate phthalate.

One or more image-forming layers are coated on the support on the side opposite to the anti-halation layer. Other layers, such as subbing layers, interlayers, filter layers, protective overcoat layers and so forth can also be present. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example gelatin, gelatin derivatives, cellulose derivatives, polysaccharides such as dextran, gum arabic, and the like, and synthetic polymeric substances such as water-soluble polyvinyl compounds like poly(vinylpyrrolidone) acrylamide polymers, and the like. A particularly common example of an image-forming layer is a gelatin silver halide emulsion layer.

The magnetic striping compositions utilized in the method of this invention are comprised of a suspension of finely-divided magnetic particles in a liquid medium. Cubic or acicular iron oxide ferromagnetic particles, particularly acicular gamma ferric oxides or acicular ferrous ferric oxides, are especially useful. Such particles may be doped with one or more metal ions of a polyvalent metal such as cobalt, nickel, chromium, zinc, manganese, and the like. A particularly desirable material is acicular gamma ferric oxide or ferrous ferric oxide having an acicularity ratio above 3, and preferably above 5, and an average particle size in the range from about 0.3 to about 1.2 microns. Additional suitable ferromagnetic particles include chromium dioxide, ferrites, alloys such as iron alloys, and the like.

In carrying out the method of this invention, any magnetic striping composition can be utilized as long as it is one that is capable of being solidified by the application of heat. For example, the solidification can be brought about by the evaporation of solvents from the striping composition, or by the action of heat in initiating chemical reaction between reactive components of the striping composition to form a polymeric solid, or by a combination of solvent evaporation and chemical reaction. The first of these processes is usually referred to as "drying" while the second and third are usually referred to as "curing." By the term "solidifying," as used herein, it is intended to include all of these processes as well as any other method of converting the stripe to a solid material. In situations where the magnetic striping composition is applied over an anti-halation layer, it can be a composition of the type described in U.S. Pat. No. 3,220,843, or in U.S. Pat. No. 3,647,541, which acts to partially or completely dissolve the anti-halation layer so as to reach the support and anchor thereto. Alternatively, it can be a composition of the type which contains an agent which is capable of reacting with the binder of the anti-halation layer to thereby insolubilize the anti-halation layer in the region of the stripe and prevent its removal in photographic processing solutions. Compositions of this type have been described in several patents, each of which relates to the use of particular insolubilizing agents; for example, the diazomethanes of U.S. Pat. No. 3,227,555, the compounds with reactive aldehyde groups of U.S. Pat. No. 3,840,374, the compounds having isocyanato or thioisocyanato groups of U.S. Pat. No. 3,870,525, the carbodiimides of U.S. Pat. No. 3,891,444, the m-benzene disulfofluorides of U.S. Pat. No. 3,999,992, and the combinations of bis-epoxides or polyepoxides with formamide or a sulfoxide of U.S. Pat. No. 4,008,088.

Generally speaking, magnetic striping compositions contain, in addition to the magnetic particles, one or more polymeric binders and one or more organic solvents. A wide variety of binders and solvents are known to be useful for this purpose. Typical examples of polymeric binders include cellulose esters, cellulose ethers, polyvinyl chloride, polyvinyl acetate, polyamides, polyesters, polyolefins, polyurethanes, polyacrylates, polyvinyl acetals, styrene-butadiene copolymers, and the like. Typical examples of organic solvents include ketones such as methyl ethyl ketone, esters such as methyl acetate, alcohols such as isopropanol, glycols such as ethylene glycol, aromatic hydrocarbons such as benzene, chlorinated hydrocarbons such as methylene chloride, and the like. The magnetic striping composition can also contain other ingredients such as surfactants, plasticizers, and lubricating agents.

An example of a magnetic striping composition that can be used in the method of this invention with particularly good results is that described in copending commonly assigned U.S. patent application Ser. No. 40,605, entitled "Photographic Element Provided With A Magnetic Recording Stripe And Method For Manufacture Thereof" filed on May 18, 1979, in the names of Edward D. Morrison, Harry J. Krall, David L. Carr and Chen-i Lu, the disclosure of which is incorporated herein by reference. As described in application Ser. No. 40,605, a magnetic striping composition containing finely-divided magnetic particles, an acrylated epoxy resin, a polymerizable acrylic monomer, and an organic solvent is capable of penetrating the anti-halation layer of a photographic element to contact the support and being cured to an alkali-insoluble cross-linked stripe which is composite with the anti-halation layer and strongly bonded to the support.

The method of this invention is characterized by the introduction of heat into a magnetic striping composition from an induction-heated roller. The roller can serve as the sole source of heat input, that is, after application of the magnetic striping composition, the photographic element can be brought, without any intervening treatment, into contact with the induction-heated roller for a time sufficient to solidify the stripe. More usually, the induction-heated roller is utilized in conjunction with a drying chamber in which the element is contacted with air or other gaseous medium that has been heated to a suitable elevated temperature. Thus, for example, the striped element can be passed from the coating zone into a chamber where it is contacted with warm air, to evaporate a portion of the solvents present in the stripe or to accomplish a partial curing, and is then brought into contact with the induction-heated roller to complete the solidification. Heat input from the induction-heated roller to the stripe can be achieved in a variety of ways. For example, when the stripe has been applied over an anti-halation layer, the photographic element can be directed so that the opposite side of the support, which bears the image-forming layer(s), comes into contact with the cylindrical surface of the induction-heated roller. This, of course, requires that the striping composition be of a type which is capable of being cured at a sufficiently low temperature that the image-forming layer(s) will not be harmed by contact with the heated surface of the roller. In an alternative embodiment of the present invention, the photographic element is directed so that the magnetic stripe comes into direct contact with the cylindrical surface of the induction-heated roller. This, of course, requires that the magnetic stripe be sufficiently firm and non-tacky, either as a result of its composition or as a result of prior partial solidification, that it can be brought into such direct contact without adhering or smearing. In yet another embodiment of the present invention, the induction-heated roller is provided with a groove in its cylindrical surface to receive the stripe and thereby avoid smearing. In utilizing a groove in this manner, the stripe will be spaced from, but very close to, the heated surface and will be heated by convection and radiation and also by conduction of heat from the layer underlying the stripe, for example, an anti-halation layer. The use of a groove is advantageous not only in avoiding smearing of the stripe but also in that the groove retards evaporation of solvents from the stripe, since they cannot readily escape. As a result of this, the temperature within the stripe is able to build up to a high level while the stripe still contains a substantial concentration of solvent. The combination of high temperature and high solvent level is very effective in achieving penetration of the anti-halation layer and strong bonding to the support.

The method of this invention comprises the steps of applying to one side of a photographic element in the form of a narrow stripe or in the form of a layer or other region, a dispersion of finely-divided magnetic particles in a liquid medium and advancing the element across and in contact with a surface of an induction-heating apparatus to solidify the dispersion by transfer of heat thereto. Methods and apparatus for induction heating are well known and are described in numerous patents, for example, in U.S. Pat. Nos. 3,395,261, 3,396,258, 3,510,619, 3,556,887, 3,561,131, and 3,652,361. Detailed information pertaining to the design of induction heating apparatus is also available in the technical literature, for example, in the article entitled "Basic Induction Heating Principles" by A. F. Leatherman and D. E. Stutz, Solid State Technology, pages 41–52, October, 1969. In the method of this invention, the induction-heating apparatus comprises a rotatable cylindrical roller whose cylindrical surface engages the photographic element and which is heated by induction only within a rim portion thereof. The "rim portion," which could also be referred to as an "annular shell," is composed of an electrically-conductive material. Thus, it is capable of generating heat in a process of induction heating. The cylindrical roller is mounted for rotation about its axis and rotates freely as the advancing photographic film engages its cylindrical surface, whereby relative motion between the film and the surface, which could abrade or otherwise damage the film, is avoided. A wide variety of different forms of cylindrical roller can be utilized with satisfactory results. For example, the roller can be composed of a core of electrically-insulating material, such as a thermosetting plastic, and a rim of electrically-conductive material. Alternatively, the roller can be a hollow cylinder composed of electrically-conductive material. The hollow cylinder can be provided with end walls adapted to permit rotation about its axis or it can be equipped with spokes. Suitable materials for the rim portion include low carbon steel, stainless steel, aluminum and copper. If the rim is composed of an electrically-conductive but non-ferromagnetic material, heat will be generated only as a result of eddy current losses. If the rim is composed of a ferromagnetic material, heat will be generated as a result of both eddy current losses and hysteresis losses. Thus, it is preferred in the method of this invention to utilize a rim composed of ferromagnetic material so as to generate heat in the most efficient manner.

It is an important feature of the method of this invention that the cylindrical roller is constructed so that heat is generated by induction only within a rim portion thereof. Use of a solid cylinder composed entirely of electrically-conductive material would be unsatisfactory. Such a cylinder would have much too high a heat capacity and, accordingly, would be too slow to heat up or cool down. It is advantageous for the rim to be quite thin in order to keep the heat capacity low and to generate heat only in the immediate vicinity of where it is needed. Most preferably, the thickness of the rim is less than one-twentieth of the diameter of the roller. The rim portion can, of course, assume a variety of configurations. For example, it can be coextensive with a core portion. Alternatively, it can be less than coextensive and constructed so that heat will be generated only in localized areas adjacent to the cylindrical surface, for example, the roller can be composed of an electrically-insulating material with narrow bands of electrically-conductive material surrounding it, such bands being parallel to and appropriately spaced from one another. The optimum design for the cylindrical roller is, in part, dependent on the width of the element being striped and on whether a single stripe or a plurality of stripes are being applied at the same time. Thus, for example, in some instances the web is cut into strips having the width of the desired product, such as a 16 mm or 35 mm motion picture film, before magnetic striping takes place and a recording stripe, or a combination of a recording stripe and a balance stripe, is applied. In other instances, the web is cut into strips that are wider than the desired product, several magnetic stripes are applied at the same time, and the strips are then cut between the stripes to produce films of the desired width. For example, a strip with a width of 35 millimeters can be coated with four recording stripes and four balance stripes and then slit to produce four 8 mm motion picture films, each of which will have a recording stripe and a balance stripe.

The induction-heating apparatus utilized in the method of this invention comprises one or more cylindrical rollers having an electrically-conductive rim portion and means for generating an alternating magnetic field which surrounds the rim portion. It can be comprised of a single cylindrical roller having an electrically-conductive rim. Alternatively, it can comprise two or more such rollers arranged so that the film passes over them in sequence. The time that the moving film remains in contact with the heated surface can thereby be regulated by the number of rollers employed as well as by the roller diameter and the speed at which the film is advanced. The means for generating an alternating magnetic field can be comprised of any suitable electric generator and control system, as are well known in the induction heating art.

The method of this invention is particularly advantageous in that solidification of the magnetic stripe can be carried out very rapidly, for example, in a period of a fraction of a second. Accordingly, the stripe can be coated and solidified while the film is travelling at very high speeds, such as speeds of up to about 500 centimeters per second or higher.

The magnetic striping composition can be applied to the photographic element by any suitable method. For example, it can be applied by the use of a coating apparatus having a rectangular extrusion slot, such as is described in U.S. Pat. No. 3,062,181, or with a coating apparatus comprising a die having a cylindrical bore as is described in Product Licensing Index, November 1971, Item No. 9111, Page 52, or with a coating apparatus comprising a die having two or more cylindrical bores as is described in Belgian Pat. No. 842,115. It can also be applied by the use of a gravure cylinder, using well known techniques of gravure or intaglio coating, or by the use of a grooved applicator roll.

In the method of this invention, heat is provided to the magnetic stripe primarily by transfer from the rim which is heated by induction. Such transfer may take place by conduction, convection and radiation as well as combinations of these three modes of heat transfer. Moreover, the heat that is received from the rim can be supplemented by heat that is generated within the stripe itself. Since the stripe contains magnetic particles, its exposure to an alternating magnetic field can generate heat within the stripe by the mechanism of induction heating. Such heating occurs as a result of hysteresis losses. This supplemental heating aids in bringing about the desired rapid solidification of the stripe. Heat can also be generated within the stripe by the mechanism of dielectric heating when materials with sufficiently high dipole moments are present in the striping composition. (See, for example, U.S. Pat. No. 2,405,249).

It should be noted that the method of this invention, which utilizes induction heating to heat the rim of a cylindrical roller, is much more efficient than a method which merely utilizes induction heating to generate heat within a magnetic stripe as a result of the presence of the magnetic particles. By heating an electrically-conductive rim and transferring the heat from the rim to the stripe, the method provides great versatility. For example, the concentration of magnetic oxide in the striping composition can be varied over a wide range without requiring any change in the characteristics of the magnetic field. Also, both a recording stripe and a balance stripe can be solidified in a single operation without requiring the use of two separately generated magnetic fields, as would otherwise be required to take into account the differences in the widths of recording and balance stripes. The induction-heated rim can also be utilized, under appropriate circumstances, to carry out a hot calendering of the magnetic stripe and thereby improve its smoothness and other physical properties. Improved smoothness is often highly desirable as it functions to enhance audio performance.

FIG. 1 illustrates apparatus suitable for applying a magnetic striping composition to a photographic film and solidifying the stripe by passing the film through a chamber, in which it is contacted with warm air, and then into contact with an induction-heating device. As shown in FIG. 1, photographic film 10 is unwound from supply roll 12 and passes under guide roll 14 and then over coating roll 16 where it is coated with a narrow stripe 18 of magnetic striping composition. The magnetic striping composition 20 is held in tank 22, where it is kept in constant agitation by mixer 24, and is pumped by metering pump 26 to coating hopper 28 which applies it in the form of a narrow stripe to film 10. Coating hopper 28 includes chamber 30, which is equipped with nozzle 32 for delivering the striping composition, and is mounted on frame member 34, equipped with rack 36 and operatively associated with pinion gear 38 such that rotation of gear 38 adjusts the vertical position of coating hopper 28 with respect to the path of film 10. A second gear (not shown) adjustably moves coating hopper 28 laterally in relation to film 10 to properly position stripe 18. After application of stripe 18 by coating hopper 28, film 10 is advanced over guide rolls 40, 42, 44 and 46 into chamber 48 in which warm air, or other suitable gaseous medium, is brought into contact with stripe 18. Warm air is supplied to chamber 48 from a suitable supply source (not shown) and passes through chamber 48 and out exhaust duct 50, carrying with it solvents that have been evaporated from stripe 18. A suitable residence time within chamber 48 is established by use of a plurality of guide rolls 52 to convey film 10 along the desired path. Upon emerging from chamber 48, film 10 passes under guide roll 54 and then around first and second induction-heated cylindrical rollers 56 and 58 which function to supply heat to stripe 18. Roller 56 is mounted for rotation about its axis and is composed of a core 60 of electrically-insulating material, such as a thermosetting plastic, and a thin rim 62 of electrically-conductive material, such as a low carbon steel. Similarly, roller 58 is mounted for rotation about its axis and is composed of a core 64 of electrically-insulating material and a thin rim 66 of electrically-conductive material. Rollers 56 and 58 are rotatably driven by frictional engagement of their cylindrical surfaces with film 10, such engagement being properly maintained by guide rolls 68 and 70. To generate heat within rims 62 and 66, an induction-heating apparatus is mounted in operative relationship with rollers 56 and 58. The induction-heating apparatus is comprised of work coil 72 and a generator/controller system 74 that is electrically connected thereto. It functions to generate an alternating magnetic field which surrounds rims 62 and 66 and thereby generates heat by induction within these rims. Work coil 72 includes a pair of tubes 76 and 76', partially surrounding roller 56, that are joined at one end to connecting block 78 and a pair of tubes 80 and 80', partially surrounding roller 58, that are joined at one end to connecting block 82. In order to prevent overheating of work coil 72 and the associated electronic equipment, cooling water is circulated from a suitable supply source (not shown) through tubes 76 and 76', which are connected together by a passageway in block 78, and also through tubes 80 and 80' which are connected together by a passageway in block 82. After passing around rollers 56 and 58, where it receives heat from induction-heated rims 62 and 66, film 10 passes under guide roll 84 and is wound up on take-up roll 86.

As shown by FIG. 2, film 10 comprises a support 11 having on one side thereof an anti-halation layer 13 and on the opposite side a red-sensitive emulsion layer 15, a gelatin interlayer 17, a green-sensitive emulsion layer 19, a yellow filter layer 21, a blue-sensitive emulsion layer 23, and a gelatin overcoat 25. Stripe 18 overlies anti-halation layer 13 and as film 10 engages the surface of rim 62, stripe 18 is maintained within a groove 63 that has been formed within rim 62. Similarly as film 10 engages the surface of rim 66, stripe 18 is maintained within a groove 67 that has been formed within rim 66. In this way, there is no direct contact between stripe 18 and either of rims 62 and 66 and the possibility of smearing of stripe 18 is avoided.

Figure 3:
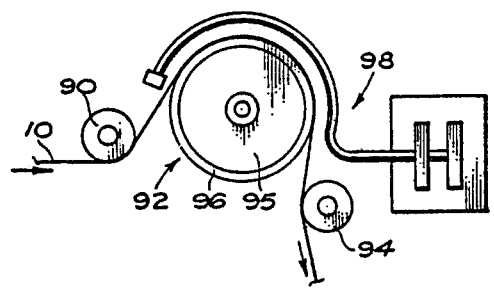
FIG. 3 is a schematic illustration of an alternative embodiment of an induction-heating device that is useful in the method of this invention.

FIG. 3 illustrates an alternative embodiment of apparatus suitable for use in the present invention in which induction heating is carried out by the use of a single cylindrical roller having a work coil extending over only the upper portion thereof. As shown in FIG. 3, film 10 passes under guide roll 90, then over cylindrical roller 92 and then around guide roll 94. Cylindrical roller 92 is comprised of electrically-insulating core 95 and electrically-conductive rim 96 and is positioned in appropriately spaced relationship with work coil 98. If desired, a groove can be formed in rim 96 to receive stripe 18.

Figure 4:
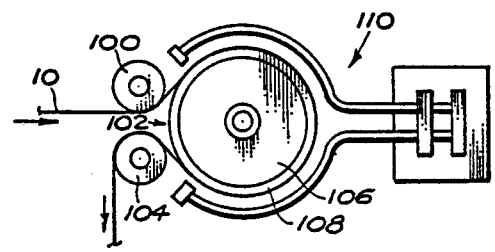
FIG. 4 is a schematic illustration of a further alternative embodiment of an induction-heating device.

FIG. 4 illustrates a further alternative embodiment of apparatus suitable for use in the present invention in which induction heating is carried out by the use of a single cylindrical roller having a work coil extending over a major portion of its cylindrical surface. As shown in FIG. 4, film 10 passes under guide roll 100, then around cylindrical roller 102 and over guide roll 104. Cylindrical roller 102 is comprised of electrically-insulating core 106 and electrically-conductive rim 108, which can have a groove therein to receive stripe 18, and is positioned in appropriately spaced relationship with work coil 110.

Figure 5:
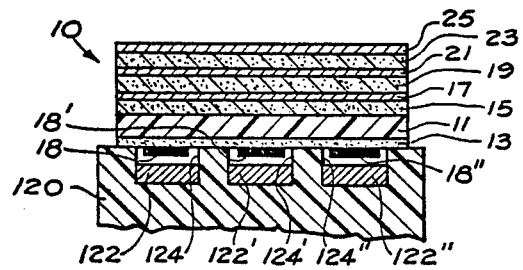
FIG. 5 is a partial cross-section illustrating yet another alternative form of induction-heating device.

FIG. 5 illustrates yet another alternative embodiment of apparatus suitable for use in the present invention, the apparatus in this instance being adapted for use with a film web on which three magnetic stripes have been applied in side-by-side relationship with the intention of subsequently slitting between the stripes to produce motion picture films. As shown in FIG. 5, a cylindrical roller 120, composed of an electrically-insulating material, is provided with bands 122, 122' and 122" of electrically-conductive material extending around its periphery. Directly above each of bands 122, 122' and 122" are grooves 124, 124' and 124". Film 10 comprises support 11 having on one side thereof, anti-halation layer 13 and, on the opposite side, red-sensitive emulsion layer 15, gelatin interlayer 17, green-sensitive emulsion layer 19, yellow filter layer 21, blue-sensitive emulsion layer 23, and gelatin overcoat 25. Overlying anti-halation layer 13 are three parallel stripes 18, 18' and 18" which are received, respectively, in grooves 124, 124' and 124". The design of this apparatus is such that heat is generated by induction only within bands 122, 122' and 122" and, thus, only within the immediate vicinity of where it is needed.

The invention is further illustrated by the following example of its practice:

A magnetic striping composition was prepared in accordance with Example 1 of U.S. Pat. No. 3,220,843. To prepare the striping composition, the ingredients were mixed together and ball milled for a period of six days. Using apparatus of the type shown in FIG. 1 herein, the striping composition was coated, as a stripe with a width of 0.69 millimeters and a thickness of 0.01 millimeters on the anti-halation layer of 16 millimeter motion picture film and the stripe was solidified. The motion picture film had a support composed of cellulose triacetate, an anti-halation layer on one side of the support containing carbon black and cellulose acetate phthalate, and a gelatin silver halide emulsion layers on the opposite side. After application of the striping composition, the film was passed through a drying chamber in which it was contacted with air maintained at a temperature of 45° C. for a period of 1.5 seconds, and then brought into contact with a pair of induction-heated cylindrical rollers. Each roller had a diameter of 20.3 centimeters and was comprised of a core formed from a thermosetting polymer and a rim, composed of low carbon steel, with a thickness of 0.32 centimeters, having a groove therein to receive the magnetic stripe. The induction-heating apparatus was a Model A-30 induction heater sold by Cycle-Dyne Inc., a subsidiary of Axel Electronics Inc., 134-20 Jamaica Avenue, Jamaica, N.Y., 11418. It was operated at a frequency of $4 \times 10^6$ hertz. The film was advanced at a speed of 203 centimeters per second and, at this speed, the temperature maintained at the outer surface of the rim was 88° C. The magnetic stripe was tested and found to be strongly adhered to the film, both in the dry state and after immersion in alkaline solutions, and to have magnetic properties rated as fully acceptable. The example was repeated using a time of 52 seconds and a temperature of 27° C. in the drying chamber and similarly good results were obtained.

The method of this invention has many advantages in the formation of magnetic recording stripes on photographic elements. For example, it permits the elimination of drying chambers in which the element is contacted with hot air, or other gaseous medium, or the use of drying chambers which are relatively short and thus of much lower cost than drying chambers required in accordance with the prior art. Prior art processes in which drying of a magnetic stripe is carried out solely by contact with hot air, or other warm gaseous medium, typically utilize a long "soak" section in which relatively mild temperatures are maintained, followed by a dryng section employing severe drying conditions, followed by a rehumidification section. The reason for having a low temperature "soak" section followed by a high temperature drying section is to prevent the solvents in the magnetic dispersion from evaporating too quickly, or evaporating to dryness at too low a temperature, as either of these conditions can cause poor adhesion of the magnetic stripe. The heat transfer coefficient in both the "soak" section and dryng section is very low, so the efficiency of the drying process is very poor. With the method of this invention, in which the photographic element comes into contact with the surface of a roller, the heat transfer coefficient is from twenty to fifty times greater. Therefore, heat is very rapidly introduced into the stripe and stripe adhesion is promoted by the high temperatures that are generated. The solvents are rapidly evaporated, but high temperatures are reached quickly while sufficient solvent is still present in the dispersion to promote adhesion.

The method of this invention enables the solidification of the magnetic stripe to be carried out very quickly, thereby facilitating the use of a high speed striping operation. It provides for input of heat to the element in a controlled and efficient manner which enables the magnetic striped to be heated rapidly without adversely affecting other parts of the photographic element. It is a clean and efficient method, as contrasted with alternative procedures such as the use of drying drums heated by steam or hot oil. These alternative procedures require the use of rotary unions which frequently have a tendency to leak, require the use of massive equipment which makes temperature response slow, and suffer from the further disadvantage that web tension uniformity is difficult to maintain. Not only is the method of this invention simple, inexpensive and convenient, but it also provides a magnetic recording stripe with excellent physical and magnetic properties which is strongly anchored to the photographic element.

The invention has been described in detail with particular reference to preferred embodiments thereof but it will be understood that variations and modifications can be effected within the spirit and scope of the invention.

We claim:

1. A method for forming a magnetic recording region on a photographic element, which comprises:
    (1) applying to said element in a predetermined form a dispersion of finely-divided magnetic particles in a liquid medium, and
    (2) bringing said element into contact with a surface of an induction-heating apparatus to solidify said dispersion by transfer of heat thereto, said apparatus comprising a cylindrical roller which is mounted for rotation about its axis and whose cylindrical surface engages said element, said roller being heated by induction only within a rim portion thereof so as to generate heat adjacent to said cylindrical surface for transfer to said element.

2. A method for forming a magnetic recording stripe on a photographic element, which comprises:
    (1) applying to said element in the form of a narrow stripe a dispersion of finely-divided magnetic particles in a liquid medium, and (2) bringing said element into contact with a surface of an induction-heating apparatus to solidify said dispersion by transfer of heat thereto, said apparatus comprising a cylindrical roller which is mounted for rotation about its axis and whose cylindrical surface engages said element, said roller being heated by induction only within a rim portion thereof so as to generate heat adjacent to said cylindrical surface for transfer to said element.

3. The method of claim 1 additionally comprising the step of advancing said element, between steps (1) and (2), through a drying chamber in which it is contacted with a warm gaseous medium.

4. A method for forming a magnetic recording stripe on a photographic element, which comprises:
(1) applying to said element in the form of a narrow stripe a dispersion of finely-divided magnetic particles in a liquid medium, and
(2) bringing said element into contact with a surface of an induction-heating apparatus to solidify said dispersion by transfer of heat thereto, said apparatus comprising:
(a) a cylindrical roller which is mounted for rotation about its axis and whose cylindrical surface engages said element, said roller comprising an electrically-insulating core portion and an electrically-conductive rim portion, and (b) means for generating an alternating magnetic field which surrounds said rim portion to generate heat therein by induction, whereby heat is generated adjacent to said cylindrical surface for transfer to said element.

5. A method for forming a magnetic recording stripe on a photographic element, which comprises:
(1) applying to said element in the form of a narrow stripe a dispersion of finely-divided magnetic particles in a liquid medium, and
(2) bringing said element into contact with a surface of an induction-heating apparatus to solidify said dispersion by transfer of heat thereto, said apparatus comprising:
(a) a cylindrical roller which is mounted for rotation about its axis and whose cylindrical surface engages said element, said roller being hollow and having an electrically-conductive rim portion, and
(b) means for generating an alternating magnetic field which surrounds said rim portion to generate heat therein by induction, whereby heat is generated adjacent to said cylindrical surface for transfer to said element.

6. The method of claim 2 wherein said induction-heating apparatus comprises a pair of cylindrical rollers, each of which is mounted for rotation about its axis, positioned to sequentially engage said element.

7. The method of claim 2 wherein said rim portion has a groove located therein to receive said stripe.

8. The method of claim 2 wherein said rim portion is composed of a ferromagnetic material.

9. The method of claim 2 wherein said photographic element comprises a support and at least one image-forming layer on one side thereof and said stripe is applied directly to said support.

10. The method of claim 2 wherein said photographic element comprises a support, at least one image-forming layer on one side thereof, and an anti-halation layer on the opposite side thereof, and said stripe is applied over said anti-halation layer.

11. The method of claim 2 wherein both a magnetic recording stripe and a balance stripe are applied to said element.

12. The method of claim 2 wherein a plurality of narrow stripes are applied to said element and said induction-heating apparatus comprises a cylindrical roller formed from electrically-insulating material having a plurality of narrow spaced bands of electrically-conductive material extending about the periphery thereof.

13. A method for forming a magnetic recording stripe on a photographic element comprising a support, at least one image-forming layer on one side thereof, and an anti-halation layer on the opposite side thereof, which method comprises:
(1) applying over the anti-halation layer of said element in the form of a narrow stripe a dispersion of finely-divided magnetic particles in a liquid medium, and
(2) bringing said element into contact with a surface of an induction-heating apparatus to solidify said dispersion by transfer of heat thereto, said apparatus comprising
(a) a cylindrical roller which is mounted for rotation about its axis and whose cylindrical surface engages said element, said roller comprising and electrically-insulating core portion and an electrically-conductive rim portion composed of a ferro-magnetic material, said rim portion having a groove located therein to receive said stripe, and
(b) means for generating an alternating magnetic field which surrounds said rim portion to generate heat therein by induction, whereby heat is generated adjacent to said cylindrical surface for transfer to said element.

* * * * *